(12) United States Patent
Carr et al.

(10) Patent No.: US 8,543,823 B2
(45) Date of Patent: Sep. 24, 2013

(54) DIGITAL WATERMARKING FOR IDENTIFICATION DOCUMENTS

(75) Inventors: J. Scott Carr, Tualatin, OR (US);
Mahmood Sher-Jan, Lake Oswego, OR (US); Kenneth L. Levy, Stevenson, WA (US); Marc D. Miller, Corte Madera, CA (US); Tyler J. McKinley, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 756 days.

(21) Appl. No.: 10/686,547

(22) Filed: Oct. 14, 2003

(65) Prior Publication Data
US 2004/0158724 A1     Aug. 12, 2004

Related U.S. Application Data

(63) Continuation-in-part of application No. 10/275,197, filed as application No. PCT/US01/14014 on Apr. 30, 2001, now Pat. No. 7,958,359, application No. 10/686,547, which is a continuation-in-part of application No. 10/394,507, filed on Mar. 21, 2003, now abandoned.

(60) Provisional application No. 60/418,762, filed on Oct. 15, 2002, provisional application No. 60/421,254, filed on Oct. 25, 2002, provisional application No. 60/367,033, filed on Mar. 22, 2002.

(51) Int. Cl.
*H04L 9/32*     (2006.01)

(52) U.S. Cl.
USPC .......................................................... 713/176

(58) Field of Classification Search
USPC ................ 726/1–6, 17, 21, 27, 30; 380/168, 380/54; 713/168, 176, 186; 709/223–225; 382/100, 232, 119; 705/19, 57–59
See application file for complete search history.

(56) References Cited

U.S. PATENT DOCUMENTS

| | | | |
|---|---|---|---|
| 4,359,633 | A | 11/1982 | Bianco |
| 4,536,013 | A | 8/1985 | Haghiri-Therani et al. |

(Continued)

FOREIGN PATENT DOCUMENTS

| | | |
|---|---|---|
| DE | 29 43 436 | 5/1981 |
| EP | 0 629 972 | 12/1994 |

(Continued)

OTHER PUBLICATIONS

U.S. Appl. No. 08/635,531, filed Apr. 25, 1996, Geoffrey B. Rhoads.

(Continued)

*Primary Examiner* — Darren B Schwartz
*Assistant Examiner* — Leynna Truvan

(57) ABSTRACT

A watermark-based age verification system is provided in one implementation. The verification system may also verify a biometric template against a biometric sample. Shelf-life identification documents are provided in another implementation. Another aspect of the present invention analyzes image data to identify a face region or silhouette associated with a human subject depicted in the image data. The image data is adjusted, e.g., to center or align a face region within an image frame. A digital watermark is embedded after realignment. Another aspect authenticates or handles digital images that are captured at a first location and transferred to a second location via watermarking. In another implementation, first machine-readable code on an identification document layer is cross-correlated with second machine-readable code on the identification document. The first and second machine-readable codes are preferably sensed though different means, but can be cross-correlated to determine authenticity of an identification document.

28 Claims, 3 Drawing Sheets

(56) References Cited

U.S. PATENT DOCUMENTS

| | | | |
|---|---|---|---|
| 4,590,366 | A | 5/1986 | Rothfjell |
| 4,675,746 | A | 6/1987 | Tetrick et al. |
| 4,689,477 | A | 8/1987 | Goldman |
| 4,728,984 | A | 3/1988 | Daniele |
| 4,790,566 | A | 12/1988 | Boissier et al. |
| 4,879,747 | A | 11/1989 | Leighton et al. |
| 4,972,476 | A | 11/1990 | Nathans |
| 4,993,068 | A | 2/1991 | Piosenka et al. |
| 4,994,831 | A | 2/1991 | Marandi |
| 5,113,445 | A | 5/1992 | Wang |
| 5,237,164 | A | 8/1993 | Takada |
| 5,284,364 | A | 2/1994 | Jain |
| 5,319,453 | A | 6/1994 | Copriviza et al. |
| 5,321,751 | A | 6/1994 | Ray et al. |
| 5,337,361 | A | 8/1994 | Wang et al. |
| 5,351,302 | A | 9/1994 | Leighton |
| 5,374,976 | A | 12/1994 | Spannenburg |
| 5,379,345 | A | 1/1995 | Greenberg |
| 5,384,846 | A | 1/1995 | Berson |
| 5,396,559 | A | 3/1995 | McGrew |
| 5,436,970 | A | 7/1995 | Ray et al. |
| 5,469,506 | A | 11/1995 | Berson |
| 5,471,533 | A | 11/1995 | Wang et al. |
| 5,490,217 | A | 2/1996 | Wang et al. |
| 5,505,494 | A | 4/1996 | Belluci et al. |
| 5,515,451 | A | 5/1996 | Tsuji et al. |
| 5,528,222 | A | 6/1996 | Moskowitz et al. |
| 5,613,004 | A | 3/1997 | Cooperman et al. |
| 5,635,012 | A | 6/1997 | Belluci et al. |
| 5,636,292 | A | 6/1997 | Rhoads |
| 5,646,997 | A | 7/1997 | Barton |
| 5,652,626 | A | 7/1997 | Kawakami et al. |
| 5,659,726 | A | 8/1997 | Sandford, II et al. |
| 5,694,471 | A | 12/1997 | Chen et al. |
| 5,710,834 | A | 1/1998 | Rhoads |
| 5,721,583 | A * | 2/1998 | Harada et al. ............... 725/24 |
| 5,721,788 | A | 2/1998 | Powell et al. |
| 5,748,763 | A | 5/1998 | Rhoads |
| 5,754,675 | A | 5/1998 | Valadier |
| 5,760,386 | A | 6/1998 | Ward |
| 5,767,496 | A | 6/1998 | Swartz |
| 5,768,426 | A | 6/1998 | Rhoads |
| 5,772,250 | A | 6/1998 | Gasper |
| 5,786,587 | A | 7/1998 | Colgate, Jr. |
| 5,787,186 | A | 7/1998 | Schroeder |
| 5,790,674 | A | 8/1998 | Houvener et al. |
| 5,799,092 | A | 8/1998 | Kristol et al. |
| 5,822,436 | A | 10/1998 | Rhoads |
| 5,832,119 | A | 11/1998 | Rhoads |
| 5,841,886 | A | 11/1998 | Rhoads |
| 5,841,978 | A | 11/1998 | Rhoads |
| 5,862,260 | A | 1/1999 | Rhoads |
| 5,864,622 | A | 1/1999 | Marcus |
| 5,864,623 | A | 1/1999 | Messina et al. |
| 5,901,224 | A | 5/1999 | Hecht |
| 5,907,149 | A | 5/1999 | Marckini |
| 5,912,974 | A | 6/1999 | Holloway et al. |
| 5,982,956 | A | 11/1999 | Lahmi |
| 5,984,366 | A | 11/1999 | Priddy |
| 6,024,287 | A | 2/2000 | Takai et al. |
| 6,084,528 | A | 7/2000 | Beach et al. |
| 6,104,812 | A | 8/2000 | Koltai et al. |
| 6,119,932 | A * | 9/2000 | Maloney et al. ............... 235/380 |
| 6,122,403 | A | 9/2000 | Rhoads |
| 6,148,091 | A * | 11/2000 | DiMaria ............... 382/115 |
| 6,196,460 | B1 | 3/2001 | Shin |
| 6,208,746 | B1 | 3/2001 | Musgrave |
| 6,229,924 | B1 | 5/2001 | Rhoads et al. |
| 6,243,480 | B1 | 6/2001 | Zhao et al. |
| 6,246,775 | B1 | 6/2001 | Nakamura et al. |
| 6,286,761 | B1 | 9/2001 | Wen |
| 6,289,108 | B1 | 9/2001 | Rhoads |
| 6,292,092 | B1 | 9/2001 | Chow et al. |
| 6,307,949 | B1 | 10/2001 | Rhoads |
| 6,311,214 | B1 | 10/2001 | Rhoads |
| 6,321,981 | B1 | 11/2001 | Ray et al. |
| 6,332,031 | B1 | 12/2001 | Rhoads et al. |
| 6,332,193 | B1 | 12/2001 | Glass et al. |
| 6,343,138 | B1 | 1/2002 | Rhoads |
| 6,381,341 | B1 | 4/2002 | Rhoads |
| 6,385,329 | B1 | 5/2002 | Sharma et al. |
| 6,389,151 | B1 | 5/2002 | Carr et al. |
| 6,408,082 | B1 | 6/2002 | Rhoads et al. |
| 6,421,070 | B1 | 7/2002 | Ramos et al. |
| 6,424,249 | B1 | 7/2002 | Houvener |
| 6,424,725 | B1 | 7/2002 | Rhoads et al. |
| 6,427,020 | B1 | 7/2002 | Rhoads |
| 6,434,561 | B1 | 8/2002 | Durst, Jr. et al. |
| 6,442,284 | B1 | 8/2002 | Gustafson et al. |
| 6,463,416 | B1 | 10/2002 | Messina |
| 6,487,301 | B1 | 11/2002 | Zhao |
| 6,516,079 | B1 | 2/2003 | Rhoads et al. |
| 6,522,770 | B1 | 2/2003 | Seder et al. |
| 6,535,617 | B1 | 3/2003 | Hannigan et al. |
| 6,542,927 | B2 | 4/2003 | Rhoads |
| 6,542,933 | B1 | 4/2003 | Durst, Jr. et al. |
| 6,546,112 | B1 | 4/2003 | Rhoads |
| 6,553,129 | B1 | 4/2003 | Rhoads |
| 6,567,533 | B1 | 5/2003 | Rhoads |
| 6,580,808 | B2 | 6/2003 | Rhoads |
| 6,590,996 | B1 | 7/2003 | Reed et al. |
| 6,608,911 | B2 | 8/2003 | Lofgren et al. |
| 6,611,607 | B1 | 8/2003 | Davis et al. |
| 6,614,914 | B1 | 9/2003 | Rhoads et al. |
| 6,636,615 | B1 | 10/2003 | Rhoads et al. |
| 6,647,128 | B1 | 11/2003 | Rhoads |
| 6,647,130 | B2 | 11/2003 | Rhoads |
| 6,650,761 | B1 | 11/2003 | Rodriguez et al. |
| 6,679,425 | B1 | 1/2004 | Sheppard et al. |
| 6,681,028 | B2 | 1/2004 | Rhoads et al. |
| 6,681,029 | B1 | 1/2004 | Rhoads |
| 6,687,345 | B1 | 2/2004 | Swartz et al. |
| 6,694,042 | B2 | 2/2004 | Seder et al. |
| 6,694,043 | B2 | 2/2004 | Seder et al. |
| 6,700,990 | B1 | 3/2004 | Rhoads |
| 6,700,995 | B2 | 3/2004 | Reed |
| 6,704,869 | B2 | 3/2004 | Rhoads et al. |
| 6,709,333 | B1 * | 3/2004 | Bradford et al. ............... 463/29 |
| 6,711,465 | B2 * | 3/2004 | Tomassi ............... 700/236 |
| 6,718,046 | B2 | 4/2004 | Reed et al. |
| 6,718,047 | B2 | 4/2004 | Rhoads |
| 6,721,440 | B2 | 4/2004 | Reed et al. |
| 6,728,390 | B2 | 4/2004 | Rhoads et al. |
| 6,744,906 | B2 | 6/2004 | Rhoads et al. |
| 6,748,533 | B1 * | 6/2004 | Wu et al. ............... 713/176 |
| 6,751,336 | B2 | 6/2004 | Zhao et al. |
| 6,760,463 | B2 | 7/2004 | Rhoads |
| 6,763,123 | B2 | 7/2004 | Reed et al. |
| 6,768,809 | B2 | 7/2004 | Rhoads et al. |
| 6,775,392 | B1 | 8/2004 | Rhoads |
| 6,782,116 | B1 | 8/2004 | Zhao et al. |
| 6,788,800 | B1 | 9/2004 | Carr et al. |
| 6,798,894 | B2 | 9/2004 | Rhoads |
| 6,804,378 | B2 | 10/2004 | Rhoads |
| 6,813,366 | B1 | 11/2004 | Rhoads |
| 6,823,075 | B2 | 11/2004 | Perry |
| 6,843,422 | B2 | 1/2005 | Jones et al. |
| 6,854,642 | B2 * | 2/2005 | Metcalf et al. ............... 235/375 |
| 6,879,701 | B1 | 4/2005 | Rhoads |
| 6,883,716 | B1 | 4/2005 | DeJong |
| 6,917,724 | B2 | 7/2005 | Seder et al. |
| 6,920,232 | B2 | 7/2005 | Rhoads |
| 6,922,480 | B2 | 7/2005 | Rhoads |
| 6,923,378 | B2 | 8/2005 | Jones et al. |
| 6,926,203 | B1 * | 8/2005 | Sehr ............... 235/492 |
| 6,944,650 | B1 | 9/2005 | Urien |
| 6,947,571 | B1 | 9/2005 | Rhoads et al. |
| 6,968,346 | B2 | 11/2005 | Hekmatpour |
| 6,970,573 | B2 | 11/2005 | Carr et al. |
| 6,975,746 | B2 | 12/2005 | Davis et al. |
| 6,978,036 | B2 | 12/2005 | Alattar |
| 6,988,202 | B1 | 1/2006 | Rhoads et al. |
| 6,996,252 | B2 | 2/2006 | Reed et al. |
| 6,999,936 | B2 * | 2/2006 | Sehr ............... 705/5 |

| | | | | | | |
|---|---|---|---|---|---|---|
| 7,003,669 | B2 | 2/2006 | Monk | 7,747,038 B2 | 6/2010 | Rhoads |
| 7,003,731 | B1 | 2/2006 | Rhoads et al. | 7,751,588 B2 | 7/2010 | Rhoads |
| 7,016,516 | B2 | 3/2006 | Rhoads | 7,751,596 B2 | 7/2010 | Rhoads |
| 7,024,016 | B2 | 4/2006 | Rhoads et al. | 7,756,290 B2 | 7/2010 | Rhoads |
| 7,024,563 | B2 * | 4/2006 | Shimosato et al. ............ 713/186 | 7,760,905 B2 | 7/2010 | Rhoads et al. |
| 7,027,614 | B2 | 4/2006 | Reed | 7,762,468 B2 | 7/2010 | Reed et al. |
| 7,035,427 | B2 | 4/2006 | Rhoads | 7,787,653 B2 | 8/2010 | Rhoads |
| 7,043,052 | B2 | 5/2006 | Rhoads | 7,792,325 B2 | 9/2010 | Rhoads et al. |
| 7,044,395 | B1 | 5/2006 | Rhoads et al. | 7,822,225 B2 | 10/2010 | Alattar |
| 7,051,086 | B2 | 5/2006 | Rhoads et al. | 7,837,094 B2 | 11/2010 | Rhoads |
| 7,054,465 | B2 | 5/2006 | Rhoads | 2001/0025342 A1 | 9/2001 | Uchida |
| 7,062,069 | B2 | 6/2006 | Rhoads | 2001/0034705 A1 | 10/2001 | Rhoads et al. |
| 7,095,871 | B2 | 8/2006 | Jones et al. | 2001/0055407 A1 | 12/2001 | Rhoads |
| 7,111,168 | B2 | 9/2006 | Lofgren et al. | 2002/0009208 A1 | 1/2002 | Alattar et al. |
| 7,111,170 | B2 | 9/2006 | Rhoads et al. | 2002/0116508 A1 | 8/2002 | Khan et al. |
| 7,113,596 | B2 | 9/2006 | Rhoads | 2002/0131076 A1 | 9/2002 | Davis |
| 7,113,614 | B2 | 9/2006 | Rhoads | 2002/0141584 A1 | 10/2002 | Razdan et al. |
| 7,139,408 | B2 | 11/2006 | Rhoads et al. | 2002/0150277 A1 | 10/2002 | Nishimoto et al. |
| 7,152,786 | B2 | 12/2006 | Brundage et al. | 2002/0168082 A1 | 11/2002 | Razdan |
| 7,158,654 | B2 | 1/2007 | Rhoads | 2002/0176003 A1 | 11/2002 | Seder et al. |
| 7,159,116 | B2 * | 1/2007 | Moskowitz .................... 713/176 | 2002/0186886 A1 | 12/2002 | Rhoads |
| 7,164,780 | B2 | 1/2007 | Brundage et al. | 2002/0196272 A1 | 12/2002 | Ramos et al. |
| 7,167,844 | B1 * | 1/2007 | Leong et al. ..................... 705/80 | 2003/0002710 A1 | 1/2003 | Rhoads |
| 7,171,016 | B1 | 1/2007 | Rhoads | 2003/0026453 A1 | 2/2003 | Bradley et al. |
| 7,171,020 | B2 | 1/2007 | Rhoads et al. | 2003/0040957 A1 | 2/2003 | Rhoads et al. |
| 7,174,031 | B2 | 2/2007 | Rhoads et al. | 2003/0105730 A1 | 6/2003 | Davis et al. |
| 7,177,443 | B2 | 2/2007 | Rhoads | 2003/0130954 A1 | 7/2003 | Carr et al. |
| 7,181,042 | B2 | 2/2007 | Tian | 2004/0005093 A1 | 1/2004 | Rhoads |
| 7,191,156 | B1 | 3/2007 | Seder | 2004/0064415 A1 | 4/2004 | Abdallah et al. |
| 7,213,757 | B2 | 5/2007 | Jones et al. | 2004/0190750 A1 | 9/2004 | Rodriguez et al. |
| 7,224,819 | B2 | 5/2007 | Levy et al. | 2004/0240704 A1 | 12/2004 | Reed |
| 7,248,717 | B2 | 7/2007 | Rhoads | 2004/0264733 A1 | 12/2004 | Rhoads et al. |
| 7,261,612 | B1 | 8/2007 | Hannigan et al. | 2005/0041835 A1 | 2/2005 | Reed et al. |
| 7,298,864 | B2 | 11/2007 | Jones | 2005/0058318 A1 | 3/2005 | Rhoads |
| 7,305,104 | B2 | 12/2007 | Carr et al. | 2005/0063562 A1 | 3/2005 | Brunk et al. |
| 7,308,110 | B2 | 12/2007 | Rhoads | 2005/0171851 A1 | 8/2005 | Applebaum et al. |
| 7,313,251 | B2 | 12/2007 | Rhoads | 2005/0192933 A1 | 9/2005 | Rhoads et al. |
| 7,319,775 | B2 | 1/2008 | Sharma et al. | 2005/0271246 A1 | 12/2005 | Sharma et al. |
| 7,330,564 | B2 | 2/2008 | Brundage et al. | 2006/0013435 A1 | 1/2006 | Rhoads |
| 7,369,678 | B2 | 5/2008 | Rhoads | 2006/0041591 A1 | 2/2006 | Rhoads |
| 7,377,421 | B2 | 5/2008 | Rhoads | 2006/0115108 A1 | 6/2006 | Rodriguez |
| 7,391,880 | B2 | 6/2008 | Reed et al. | 2006/0251291 A1 | 11/2006 | Rhoads |
| 7,400,743 | B2 | 7/2008 | Rhoads et al. | 2007/0027818 A1 | 2/2007 | Lofgren et al. |
| 7,406,214 | B2 | 7/2008 | Rhoads et al. | 2007/0055884 A1 | 3/2007 | Rhoads |
| 7,412,072 | B2 | 8/2008 | Sharma et al. | 2007/0108287 A1 | 5/2007 | Davis et al. |
| 7,424,131 | B2 | 9/2008 | Alattar et al. | 2007/0154064 A1 | 7/2007 | Rhoads et al. |
| 7,427,030 | B2 | 9/2008 | Jones et al. | 2007/0276841 A1 | 11/2007 | Rhoads et al. |
| 7,433,491 | B2 | 10/2008 | Rhoads | 2007/0276928 A1 | 11/2007 | Rhoads et al. |
| 7,444,000 | B2 | 10/2008 | Rhoads | 2008/0082618 A1 | 4/2008 | Jones |
| 7,444,392 | B2 | 10/2008 | Rhoads et al. | 2008/0121728 A1 | 5/2008 | Rodriguez |
| 7,450,734 | B2 | 11/2008 | Rodriguez et al. | 2008/0133555 A1 | 6/2008 | Rhoads et al. |
| 7,460,726 | B2 | 12/2008 | Levy et al. | 2008/0215636 A1 | 9/2008 | Lofgren et al. |
| 7,466,840 | B2 | 12/2008 | Rhoads | 2008/0292134 A1 | 11/2008 | Sharma et al. |
| 7,486,799 | B2 | 2/2009 | Rhoads | 2009/0012944 A1 | 1/2009 | Rodriguez et al. |
| 7,499,566 | B2 | 3/2009 | Rhoads | 2009/0116687 A1 | 5/2009 | Rhoads et al. |
| 7,502,759 | B2 | 3/2009 | Hannigan et al. | 2009/0125475 A1 | 5/2009 | Rhoads et al. |
| 7,502,937 | B2 | 3/2009 | McKinley et al. | 2009/0129627 A1 | 5/2009 | Levy et al. |
| 7,508,955 | B2 | 3/2009 | Carr et al. | 2009/0232352 A1 | 9/2009 | Carr et al. |
| 7,515,733 | B2 | 4/2009 | Rhoads | 2009/0286572 A1 | 11/2009 | Rhoads et al. |
| 7,536,034 | B2 | 5/2009 | Rhoads et al. | 2009/0290754 A1 | 11/2009 | Rhoads |
| 7,537,170 | B2 | 5/2009 | Reed et al. | 2010/0009714 A1 | 1/2010 | Sharma et al. |
| 7,545,952 | B2 | 6/2009 | Brundage et al. | 2010/0027837 A1 | 2/2010 | Levy et al. |
| 7,564,992 | B2 | 7/2009 | Rhoads | 2010/0045816 A1 | 2/2010 | Rhoads |
| 7,570,784 | B2 | 8/2009 | Alattar | 2010/0054529 A1 | 3/2010 | Rhoads |
| RE40,919 | E | 9/2009 | Rhoads | 2010/0062819 A1 | 3/2010 | Hannigan et al. |
| 7,602,978 | B2 | 10/2009 | Levy et al. | 2010/0094639 A1 | 4/2010 | Rhoads |
| 7,628,320 | B2 | 12/2009 | Rhoads | 2010/0142749 A1 | 6/2010 | Ellingson et al. |
| 7,630,986 | B1 * | 12/2009 | Herz et al. ....................... 707/10 | 2010/0172540 A1 | 7/2010 | Davis et al. |
| 7,639,837 | B2 | 12/2009 | Carr et al. | 2010/0198941 A1 | 8/2010 | Rhoads |
| 7,643,649 | B2 | 1/2010 | Davis et al. | 2010/0296526 A1 | 11/2010 | Rhoads |
| 7,650,009 | B2 | 1/2010 | Rhoads | 2011/0007936 A1 | 1/2011 | Rhoads |
| 7,653,210 | B2 | 1/2010 | Rhoads | | | |
| 7,657,058 | B2 | 2/2010 | Sharma | | | |
| 7,685,426 | B2 | 3/2010 | Ramos et al. | | | |
| 7,693,300 | B2 | 4/2010 | Reed et al. | FOREIGN PATENT DOCUMENTS | | |
| 7,697,719 | B2 | 4/2010 | Rhoads | EP | 0 642 060 B1 | 3/1995 |
| 7,711,143 | B2 | 5/2010 | Rhoads | EP | 0 736 860 | 10/1996 |
| 7,724,920 | B2 | 5/2010 | Rhoads | JP | 03-185585 | 8/1991 |
| 7,738,673 | B2 | 6/2010 | Reed | WO | WO 95/13597 | 5/1995 |

| | | |
|---|---|---|
| WO | WO 96/03286 | 2/1996 |
| WO | WO 00/36605 | 6/2000 |
| WO | WO 01/43080 | 6/2001 |

OTHER PUBLICATIONS

U.S. Appl. No. 09/413,117, filed Oct. 6, 1999, Geoffrey B. Rhoads.
U.S. Appl. No. 09/507,096, filed Feb. 17, 2000, Geoffrey B. Rhoads et al.
U.S. Appl. No. 12/912,461, filed Oct. 26, 2010, Adnan M. Alattar.
U.S. Appl. No. 09/482,749, filed Jan. 13, 2000, Geoffrey B. Rhoads.
U.S. Appl. No. 09/234,780, filed Jan. 20, 1999, Geoffrey B. Rhoads.
U.S. Appl. No. 09/343,104, filed Jun. 29, 1999, Tony F. Rodriguez et al.
U.S. Appl. No. 09/697,009, filed Oct. 25, 2000, Bruce L. Davis et al.
U.S. Appl. No. 09/967,015, filed Oct. 25, 2000, Bruce L. Davis.
U.S. Appl. No. 09/633,587, filed Aug. 7, 2000, Geoffrey B. Rhoads et al.
U.S. Appl. No. 09/567,405, filed May 8, 2000, Geoffrey B. Rhoads et al.
U.S. Appl. No. 09/689,289, filed Oct. 11, 2000, Geoffrey B. Rhoads et al.
U.S. Appl. No. 09/629,649, filed Aug. 1, 2000, J. Scott Carr et al.
U.S. Appl. No. 09/552,998, filed Apr. 19, 2000, Tony F. Rodriguez et al.
U.S. Appl. No. 09/343,101, filed Jun. 29, 1999, Bruce L. Davis et al.
U.S. Appl. No. 12/953,190, filed Nov. 23, 2010, Geoffrey B. Rhoads.
U.S. Appl. No. 09/538,493, filed Mar. 30, 2000, Geoffrey B. Rhoads.
U.S. Appl. No. 10/137,124, filed May 1, 2002, Brett A. Bradley et al.
"Best Practices for the Use of Magnetic Stripes," MVIS Magnetic Stripe Working Group, Report to AAMVA, Version 2.0, Apr. 1996, including a history on p. 3, 27 pages.
Chow et al., "Forgery and Tamper-Proof Identification Document," IEEE Proc. 1993 Int. Carnahan Conf. on Security Technology, Oct. 13-15, 1993, pp. 11-14.
Komatsu et al., "Authentication System Using Concealed Image in Telematics," Memoirs of the School of Science & Engineering, Waseda Univ., No. 52, 1988, pp. 45-60.
Komatsu et al., "A Proposal on Digital Watermarking in Document Image Communication and Its Application to Realizing a Signature," Electronics and Communications in Japan, Part I, vol. 73, No. 5, 1990, pp. 22-33.
Lin, C.-Y. et al., "Generating Robust Digital Signature for Image/Video Authentication," Proc. Multimedia and Security Workshop at ACM Multimedia'98, Sep. 1998, pp. 49-54.
Matsui et al., "Embedding a Signature to Pictures Under Wavelet Transformation," Transactions of the Institute of Electronics Information and Communication Engineers D-II, vol. J79D-II, No. 6, Jun. 1996, pp. 1017-1024.
Szepanski, "A Signal Theoretic Method for Creating Forgery-Proof Documents for Automatic Verification," Proceedings 1979 Carnahan Conference on Crime Countermeasures, May 16, 1979, pp. 101-109.

* cited by examiner

FIG. 1
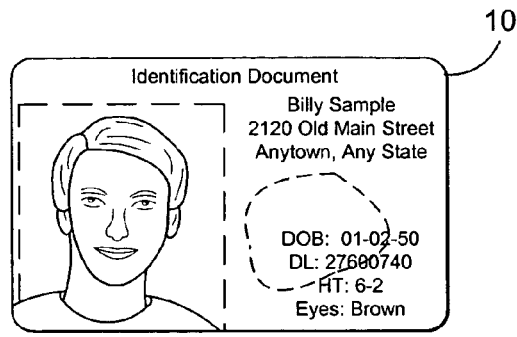
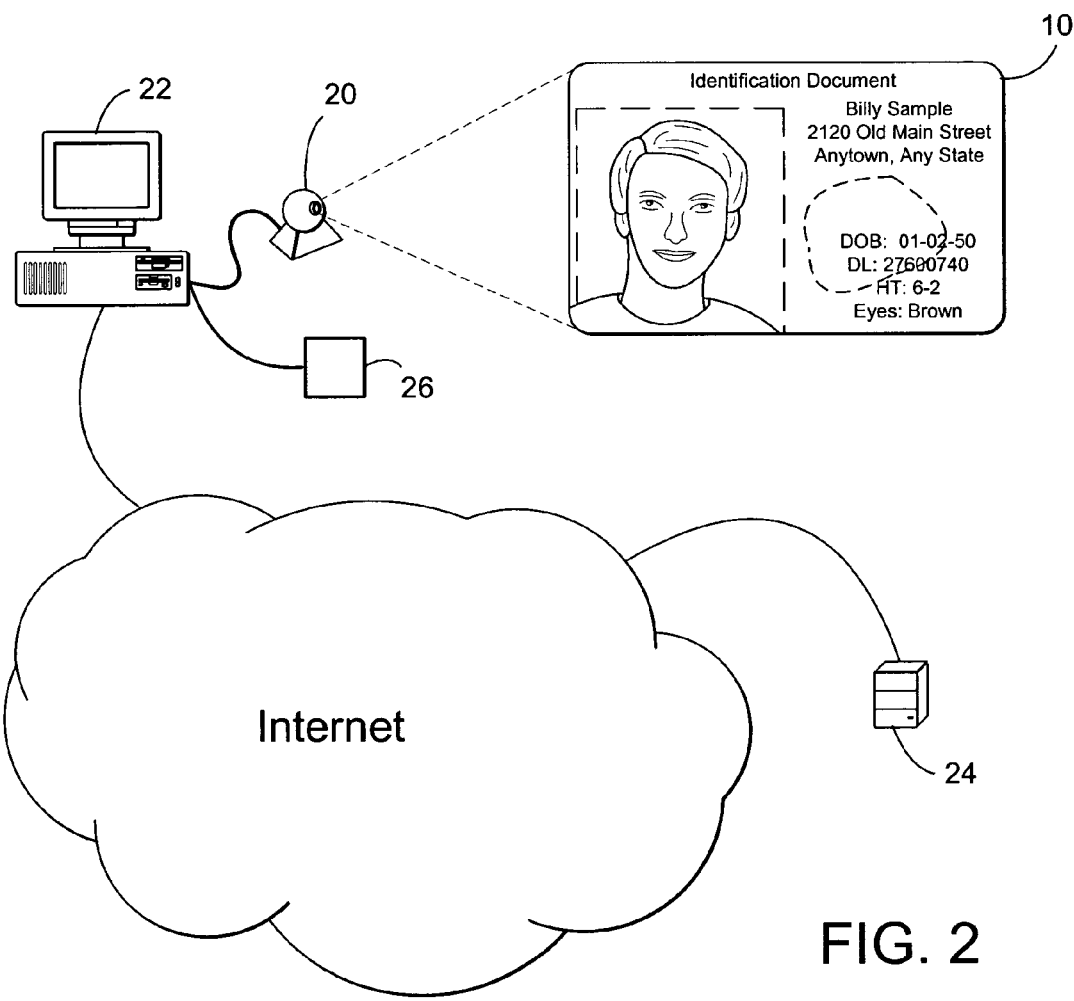
FIG. 2

FIG. 5
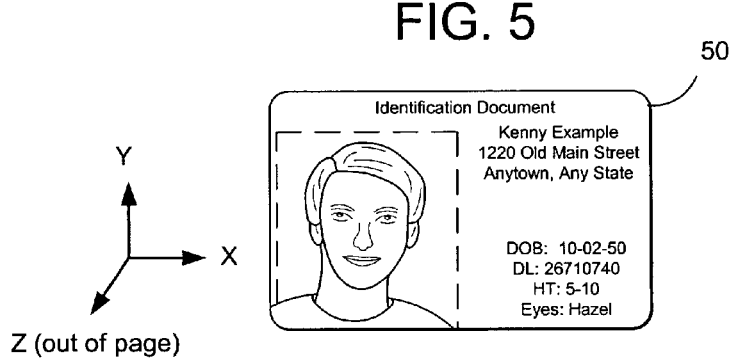
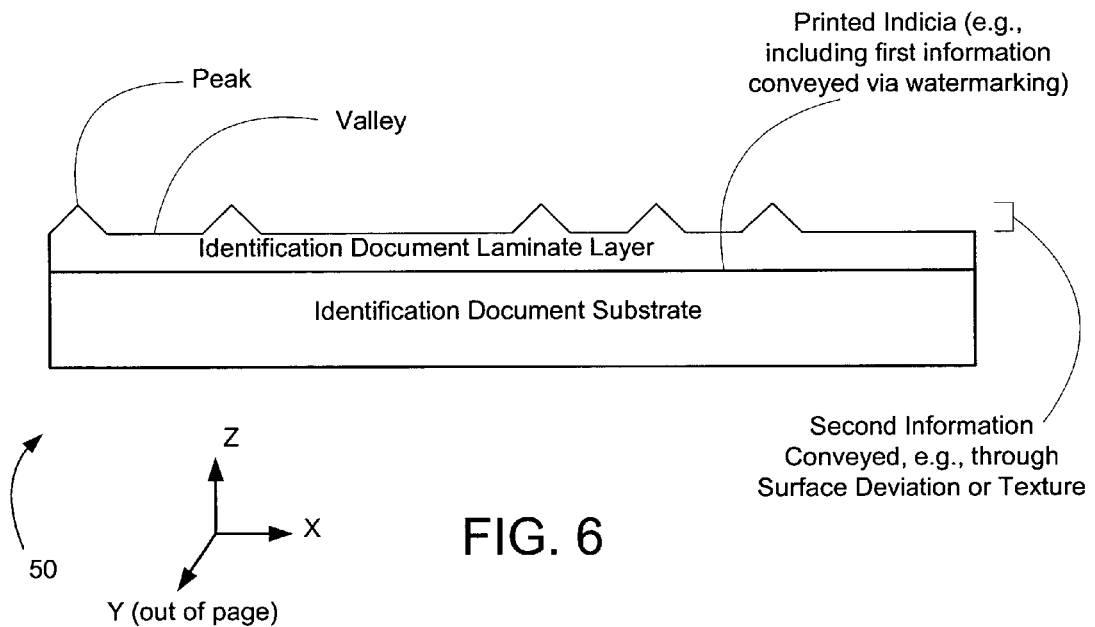
FIG. 6

DIGITAL WATERMARKING FOR IDENTIFICATION DOCUMENTS

RELATED APPLICATION DATA

The present application claims the benefit of U.S. Provisional Patent Application Nos. 60/418,762, filed Oct. 15, 2002 and 60/421,254, filed Oct. 25, 2002. The present application is also a continuation in part of U.S. patent application Ser. No. 10/275,197, filed Mar. 4, 2003 (published as US 2004-0128512 A1), which is the national stage of International Application No. PCT/US01/14014, filed Apr. 30, 2001 (published in English as WO 01/84438 A1). The present application is also a continuation in part of U.S. patent application Ser. No. 10/394,507, filed Mar. 21, 2003 (published as US 2004-0047490), which claims the benefit of U.S. Provisional Patent Application No. 60/367,033.

The present application is also related to assignee's U.S. patent application Ser. No. 09/938,870, filed Aug. 23, 2001 (published as US 2002-0099943 A1), U.S. patent application Ser. No. 10/370,421, filed Feb. 19, 2003 (published as US 2004-0049401) and assignee's concurrently filed U.S. patent application Ser. No. 10/686,495 (published as US 2004-0181671 A1).

Each of these patent documents is herein incorporated by reference.

FIELD OF THE INVENTION

The present invention relates to hidden data systems, and is particularly illustrated with reference to identification documents including digital watermarks.

BACKGROUND AND SUMMARY OF THE INVENTION

Digital watermarking technology, a form of steganography, encompasses a great variety of techniques by which plural bits of digital data are hidden in some other object preferably without leaving human-apparent evidence of alteration.

Digital watermarking modifies media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including text documents (e.g., through printing, line, word or character shifting), software, multi-dimensional graphics models, and surface textures of objects. Of course, images, graphics, background patterns, seals, logos and artwork can be watermarked and then printed or applied to documents or other objects.

Other techniques extend the texturing techniques, e.g., by employing an intaglio press to texture the media as part of the printing process (either without ink, or with clear ink).

Printable media—especially for security documents (e.g., banknotes, checks, etc.) and identification documents (e.g., passports, driver's licenses, bank cards, visas, government issued documentation, company cards or badges, photograph identification cards, etc.)—are ideally suited to receive digital watermarking. The terms "ID document" and "card" are sometime interchangeably used for "identification document."

Digital watermarking systems have two primary components: an embedding component that embeds a watermark in media content, and a reading component that detects and reads the embedded watermark. The embedding component embeds a watermark pattern by subtly altering data samples of the media content. The alterations usually take the form of altered signal values, such as slightly changed pixel values, picture luminance, picture colors, changed DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. The watermark reading component analyzes content to detect whether a watermark pattern is present. In applications where the watermark encodes information, the reading component extracts this information from the detected watermark.

The watermark components may be located in different spatial or temporal locations in a host signal. In images, for example, different components may be located in different parts of the image. Each component may carry a different message or perform a different function.

The watermark components may be defined, embedded and extracted in different domains. Examples of domains include spatial and frequency domains. A watermark may be defined in a domain by specifying how it alters the host signal in that domain to effect the encoding of the watermark component. A frequency domain component alters the signal in the frequency domain, while a spatial domain component alters the signal in the spatial domain. Of course, such alterations may have an impact that extends across many transform domains.

In addition, components may be located in different spatial portions of the host signal, and may carry the same or different messages.

The host signal can vary as well. The host is typically some form of multi-dimensional media signal, such as an image? audio sequence or video sequence. In the digital domain, each of these media types is represented as a multi-dimensional array of discrete samples. For example, a color image has spatial dimensions (e.g., its horizontal and vertical components), and color space dimensions (e.g., YUV or RGB). Some signals, like video, have spatial and temporal dimensions. Depending on the needs of a particular application, the embedder may insert a watermark signal that exists in one or more of these dimensions.

While described here as watermark components, one can also construe the components to be different watermarks. This enables the watermark technology described throughout this document to be used in applications using two or more watermarks. For example, some copy protection applications of the watermark structure may use two or more watermarks, each performing similar or different functions. One mark may be more fragile than another, and thus, disappear when the combined signal is corrupted or transformed in some fashion. The presence or lack of a watermark or watermark component conveys information to the detector to initiate or prohibit some action, such as playback, copying or recording of the marked signal. Or portions of the various watermark components can be compared for authentication.

A watermark system may include an embedder, detector, and reader. The watermark embedder encodes a watermark signal in a host signal to create a combined signal. The detector looks for the watermark signal in a potentially corrupted version of the combined signal, and computes its orientation. Finally, a reader extracts a message in the watermark signal from the combined signal using the orientation to approximate the original state of the combined signal.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark is preferably difficult to tamper with or remove by those seeking to circumvent it. To be robust, a watermark preferably withstands routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

In most embodiments, a watermark payload is uniform across the medium. In some applications, however, it may be desirable to encode different payloads in different regions of a medium, or to convey different payloads through different digital watermarks or watermark components.

In other arrangements, the same watermark may be encoded in different places (e.g., on front and reverse sides of a document). A different embedded pattern can be used in different places to encode the same watermark payload.

The watermark can convey a payload of arbitrary length, commonly in the 2-256 bit range, and perhaps most commonly between 24 and 72 bits. Error correcting coding, such as convolutional coding or BCH coding, can be employed to transform a base payload (e.g., 52 bits) to a longer data string (e.g., 96-1024 bits), assuring robustness in detection notwithstanding some data corruption (e.g., due to wear and tear of the medium, artifacts from scanning, etc.). The bits of this longer string are mapped, e.g., pseudo-randomly, to define the pattern (e.g., checkerboard or tiled).

Several particular digital watermarking techniques have been developed. The reader is presumed to be familiar with the literature in this field. Some techniques for embedding and detecting imperceptible watermarks in media signals are detailed in the assignee's U.S. Pat. Nos. 6,122,403 and 6,614,914 and International Application No. PCT/US02/20832 (published as WO 03/005291), which are each herein incorporated by reference.

One aspect of the present invention is an age verification system and process. A document includes auxiliary information steganographically embedded therein. The auxiliary data is used to verify a document bearer's age and whether the bearer is an authorized bearer of the document. The auxiliary data may include or link to biometric information that is associated with an authorized bearer of the document. The data may further include or link to information corresponding to the document bearer's age.

Another aspect of the present invention is a shelf-life identification document. The self-life identification document provides an expiration indicator that becomes evident with use or time. In one implementation we provide a digital watermark through low adhesive inks. The ink degrades or rubs off with use. The watermark is lost as the ink degrades. In a related implementation, a digital watermark is provided on a document surface with relatively high-adhesive ink. The digital watermark is overprinted with a second, relatively low-adhesive ink. The second ink degrades or rubs off with time or use, thus revealing the digital watermark below. The absence or presence of a digital watermark on a shelf-life identification document provides an expiration trigger.

One aspect of the present invention relates to identifying different regions in image data. For example, the image data may correspond to a human subject (e.g., as expected with a passport or driver's license photograph). A face locator is used to identify an image region corresponding to a face or human silhouette. Once identified, the image data can be realigned to center the face or silhouette within a predetermined area or in a center of an image frame. A digital watermark can be embedded in the realigned image data. Or a first digital watermark component can be embedded in the face region or silhouette, while a second digital watermark component can be embedded in a background portion (e.g., an image portion which does not include the face region or silhouette). The first and second digital watermark components can be correlated for authentication.

Another aspect of the present invention relates to authenticating and identifying digital images. A digital image is captured, e.g., at a DMV location, depicting a human subject. A so-called reversible digital watermark is embedded in the digital image. The reversible digital watermark includes an identifier or other payload information. The embedded digital image is then distributed to a centralized identification document production facility. The digital watermark is removed from the digital image and the identifier is obtained. The identifier is used to access information associated with the human subject. The associated information can be embedded in the digital image prior to printing the digital image on an identification document. The digital watermark can also be used to authenticate the digital image, e.g., to verify an expected distribution source or image capture location.

This disclosure also provides methods and systems for reading differently hidden information from identification documents. In one implementation an identification document includes first information steganographically embedded in a photograph or background. A preferred form of steganography is digital watermarking. The first information is typically printed on identification document (e.g., on a substrate or laminate layer). The document further includes second information hidden on a document layer. For example, the second information is conveyed through surface topology of a laminate layer. An optical sensor reads the first information, while non-visible light scanner, e.g., a laser, reads the second information.

The foregoing and other features and advantages of the present invention will be even more readily apparent from the following detailed description, which proceeds with reference to the accompanying drawings.

BRIEF DESCRIPTION OF THE DRAWINGS

FIG. 1 illustrates a document including steganographic encoding according to an illustrative implementation of the present invention.

FIG. 2 illustrates an age verification system according to another illustrative implementation of the present invention.

FIG. 5 illustrates an identification document.

FIG. 6 illustrates a cross-sectional view of the FIG. 5 identification document, including a laminate layer and substrate layer.

DETAILED DESCRIPTION

Introduction

Figure 3:
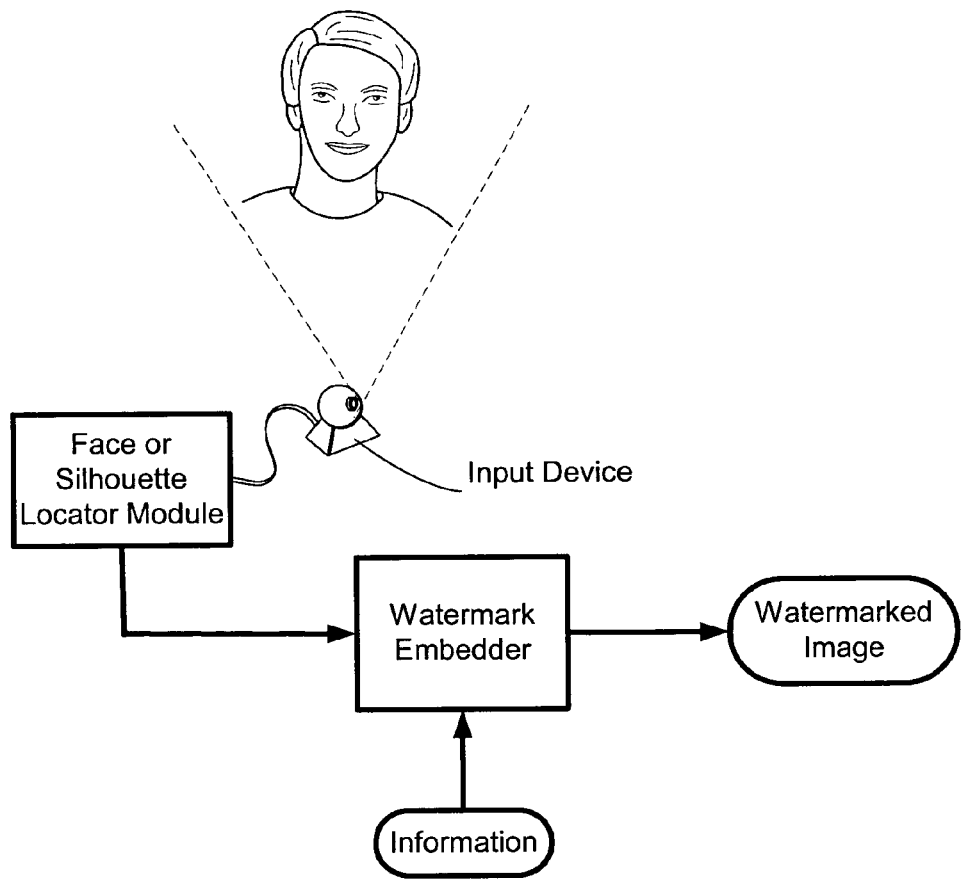
FIG. 3 illustrates image capture and a watermark embedding system.

The following detailed description is grouped into four main sections. The grouping is not meant to limit the scope of the present invention, and is merely provided for the reader's convenience. Indeed, we anticipate that disclosed methods, systems and identification documents found under one section heading can be readily combined with methods, systems and identification documents under another section heading. The first section, "Digital Watermarking Implementations involving Age or Privacy," teaches various methods and systems for age-based authentication of individuals or identification documents. Age-related information is communicated or accessed via a digital watermark. The second section, "Self-life Identification Document," discloses identification documents including to a limited life span. A digital watermark can be used to evidence the expiration of an identification document. The third section, "Image Capture and Watermark Embedding Systems using Reversible Watermarking," provides systems and methods for handling digital images captured, e.g., for use with identification documents. The fourth section, "Marking Multiple Layers of an Identification Document for Additional Security," discloses identification documents including multiple, but differently marked, steganographic indicia. Other features and aspects are provided under the respective section headings.

Digital Watermarking Implementations involving Age or Privacy

In accordance with one implementation of the present invention, a document 10 includes plural-bit digital data steganographically encoded therein (e.g., by digital watermarking). The document 10 can be an identification document (e.g., a driver's license, student ID, passport, visa, voter registration cards or voter ballots, photo ID, government issued documentation, company card, employee badge, etc.), a value document (e.g., a banknote, stock certificate, check, or other financial instrument), a credit card, ATM card, a product manual, bank or credit account card, registration card, or virtually any other type of document or object. Although document 10 is illustrated as including a photograph, this aspect of present invention is not so limited.

The encoding of the document can encompass images, seals, logos, background patterns, tints, artwork or graphics (represented generally as the somewhat circular dashed line in FIG. 1), or printing on a document surface, the document's background, a laminate layer applied to the document, surface texture, etc. If a photograph is present, it too can be encoded. A variety of watermark encoding techniques are detailed in the cited patents and applications; many more are known to artisans in the field.

Voting System

One aspect of the present invention utilizes a digitally watermarked document 10 in an online (e.g., internet or other network) voting system. Registered voters receive a digitally watermarked ballot (or other watermarked document). The ballot preferably includes an embedded voting identifier that helps to facilitate access to a voting website or other network interface. In one embodiment, the identifier is used to link to an appropriate voting web site. For example, the identifier, once decoded from a watermark, is provided to a database to index a corresponding URL or IP address stored in a database. Further information regarding watermark-based linking is found, e.g., in assignee's U.S. patent application Ser. No. 09/571,422, filed May 15, 2000 (now U.S. Pat. No. 6,947, 571), which is herein incorporated by reference. In another embodiment, a watermark identifier provides an additional security feature or verifies an ability to vote. For example, verifying an ability to vote may include identifying an eligible voter, verifying voter eligibility, identifying a registered voter, verifying residency or citizenship, anonymously identifying a voter, pointing to a voter identifier or account, etc. In a preferred voting embodiment, a voter must have physical possession of the watermarked ballot (or other voter document) to be able to vote. In this voting embodiment, the ballot is presented to a watermark reader, which extracts an embedded identifier, and passes the extracted identifier to a central or distributed voting server. The identifier can be compared against a list or range of valid identifiers.). Of course, a watermarked ballot can be used in combination with other security features, such as a password or PIN. In this case, a voter demonstrates both physical possession of a watermark ballot (or other document), and knowledge of a password or PIN.

Instead of using a watermarked ballot, another embodiment verifies voter identity through machine-sensing a digital watermarked driver's license, passport, and/or ID card. An embedded identifier in such a document is extracted and used to verify identity. For example, a voting system interfaces with a division of motor vehicles (DMV) database to match extracted identifiers with corresponding driver's license identifiers. (Of course, such information can otherwise be shared with a voting server.). Alternatively, a central database manages identifiers for both the DMV and voting system. Voter identity or eligibility can be verified as such.

Once voter identity is verified as discussed above, the actual voting selection is preferably designed to protect voter anonymity. Also, instead of voting, such systems and methods described above may be used to register voters.

In an alternative embodiment, a voter is presented with a voter ballot. The voter ballot includes a digital watermark embedded therein. The voter fills out the ballot and presents the filled-in ballot to a camera, such as a web camera connected to a personal computer. The web camera captures image data representing the filled-in ballot and communicates such to a watermark detector. The watermark detector analyzes the image data to detect and read the watermark. The detector verifies the authenticity of the voter ballot via the watermark. (In some cases the mere absence of an expected digital watermark signals a problem with the ballot. In other cases the watermark includes an identifier which is checked against a data repository of identifiers. If the identifier has been used before, the ballot is considered suspect. In still other cases, the ballot is cross-correlated with another document, like a driver's license, via a digital watermark in each document. The two watermarks must correspond in an anticipated manner for the ballot to be considered valid. In even further embodiments the watermark includes a so-called fragile component, which is designed to be lost or to predictably degrade with copying.). A character recognizer can read the voter's vote by analyzing the captured image data. The recognized vote can be electronically counted. For example, software executing on the personal computer can scan the image data looking for a "check" or other mark indicating a vote. (If the watermark includes a so-called orientation component, the image data can be registered according to the orientation component.). Presenting a watermarked ballot is voter-friendly, alleviating voter's fear to use a computer for voting, as well as providing a secure voting approach via the watermarked ballot. (As alluded to above, this and the other embodiments can identify ballot re-use/copying by saving ballot identification information, such as a document identifier, a voter's name, address, or DOB, etc., in a central database and verifying the watermarked ballot has not yet been used with each use.)

Using Digital Watermark Embedded in Driver's License to Verify Age

Watermarked driver's licenses (or other ID cards, including a passport) can be used to verify age and/or other personal information. To implement, a driver's license is embedded with an identifier. The identifier is used to link to additional information (e.g., age, birth date, address, citizenship, name, social security number, physical characteristics such as height, weight, hair and eye color, biometric and/or an image of the card holder, etc.) stored in a central or distributed database. Of course, a central server or a distributed server can maintain the database.

When image data corresponding to a watermarked driver's license is presented to a watermark reader, the reader extracts the identifier and conveys the identifier to the database. The database is interrogated with the identifier to find the additional information. The additional information, or a portion of the additional information, is passed back to the watermark reader or to a computer cooperating with the reader.

In one implementation a watermark reader, or an online server in communication with the reader, determines whether the watermark license holder is old enough to enter an online web site such as an adult-oriented web site. Another implementation is used by clubs, casinos, and/or alcohol-serving establishments to verify a license holder's age. A watermarked license can be used in connection with so-called fragile watermarks to even further enhance security and prevent tampering. A fragile watermark typically degrades or is lost upon copy and print processing, or when digitally reproduced and printed.

In another embodiment, instead of embedding a database-linked identifier in an ID card, a card is embedded with a different payload. In this embodiment, the payload itself conveys the age (and/or other information) of the cardholder. Typically, the payload may include from 2-256 bits of information, which can be used by a watermark reader to determine age, and other related information.

Thus, a birth date or age indicator can provide anonymous age verification, especially for online verification or age-dependant transactions. For example an online merchant can verify a person's age (e.g., as embedded in a digital watermark) without compromising the person's identity.

Privacy Watermarking

In a related implementation we steganographically embed characteristics associated with a cardholder's biometric features, e.g., fingerprint, facial recognition, DNA-print, etc., in an identification document 10 or other card. The characteristics may even include a hash of such biometric information. The term "hash" is broadly used in this document to include a reduced representation of a value, text or template. To verify that a person is not just, e.g., using their older sister's identification document for an online transaction, the cardholder must present her watermarked document, which includes an embedded age indicator and embedded biometric characteristic, as well as a fresh biometric sample (e.g., her fingerprint)

. If the biometric sample and the embedded sample match, and if the embedded age indicator is sufficient for the activity, the activity or transaction can proceed. Similar techniques can be used to verify age at a bar, casino, or for the purchase of age-limited goods or merchandise—all without compromising the person's identity. Steganographically embedding biometric information is discussed even further, e.g., in assignee's U.S. patent application Ser. No. 10/366,541 (now U.S. Pat. No. 6,804,378), which is a continuation of U.S. Patent No. 6,546,112, and in U.S. Provisional Patent Application No. 60/493,687, filed Aug. 7, 2003. Each of these patent documents is herein incorporated by reference.

To further illustrate, consider FIG. 2. A user presents a digitally watermarked object 10 to an optical sensor 20. The object's 10 digital watermark includes auxiliary data. The optical sensor 20 can take a variety of forms, e.g., like a web camera, digital camera, a cell phone camera, flatbed scanner, optical array, etc. The optical sensor 20 need not be physically tethered to a computer 22 as shown. Instead, the optical sensor 20 wirelessly communicates with computer 22, may be integrated with computer 22 (e.g., handheld device or cell phone) or communicates with the computer 22 via a network. The optical sensor 20 captures scan data representing the object 10 or a portion of the object 10. A digital watermark decoder, e.g., software executing on computer 22 or executing at another network location, analyzes the scan data to recover the auxiliary data. Once recovered, the auxiliary data is used to validate the user's authority to possess the object 10 and/or the user's age. For example, the auxiliary data is used to locate and/or interrogate a data repository 24. The data repository may be local with respect to computer 22 or remote as shown in FIG. 2. The data repository 24 includes a biometric template (hereafter referred to as a "control biometric"). The control biometric corresponds to a fingerprint, retinal or iris, DNA, voiceprint, hand geometric, facial map or photographic image, etc., of an authorized bearer of object 10. The user presents herself to a biometric reader 26, e.g., a fingerprint reader, an iris or retina scanner, a facial recognizer, etc. The biometric reader 26 generates a biometric template (hereafter referred to as a "sample biometric"). The sample biometric and the control biometric are compared to determine whether they coincide within an expected tolerance.

The data repository 24 may also include an age indicator to help verify the user's age. (Thus, an age verification process may include a two-tiered process which involves comparing biometrics and looking at an age indicator.) For example, the age indicator can be cross-correlated with information (e.g., an age or birth date) carried in the watermark's auxiliary data. Most preferable is to protect the user's identity. For example, the biometric template is preferably not associated with the user's name, social security number or identity. Instead, the auxiliary data includes an identifier, which associates the object with the biometric template.

In a related implementation, the auxiliary data itself carries a control biometric. The control biometric is then compared with a sample biometric as provided by the user. The auxiliary data preferably includes an age identifier, which is used to regulate access to age-restricted activities (e.g., gambling, restricted movies, adult-content or establishments, driving privileges, alcohol, tobacco, voting, etc.).

A website or facility (e.g., bar or casino) has greater assurance that the cardholder is of an appropriate age when the cardholder's biometric sample matches the embedded biometric template and when an age indicator (e.g., as carried by watermark auxiliary data) indicates that the cardholder is a certain age (e.g., indicates that the cardholder is 21).

In a related implementation a biometric sampling device (e.g., fingerprint reader, retinal scanner, etc.) or a computer cooperating with the sampling device incorporates a timestamp with a biometric sample. This may help prevent an unauthorized user from trying to spoof the system by using a stored biometric sample that corresponds to the authorized bearer of object 10, instead of her own biometric sample. A comparison step may then use the timestamp to determine whether the biometric sample is fresh.

These ideas are naturally extended with a copy detect watermark to provide both age verification and security document authentication—both anonymously. (A copy detect watermark is one that indicates whether a detected watermark, or underlying media or document, is a copy. The copy detect watermark can be fragile or can include message bits to indicate the copy, etc.).

For identification document authentication, an embedded message in an identification document photograph (or graphic) is preferably compared to a hash of information printed or carried on the card. A complete hash of the information, e.g., a 64-bit payload, includes two hashes, such as a short hash and long hash. The long hash can be registered in a data repository as a cardholder's official registered identifier. The long hash carries or links to information which will identify the identification document or an authorized bearer of the identification document. Information associated with the person can be stored to be accessed with the full or long hash. The short hash is used to identify the identification document (or simply to identify a certain age or age level). For example, a 12-bit short hash has 4096 numbers—producing an extremely small likelihood of overlap. As such, a bar or casino can demonstrate that they checked everyone in the bar or casino through examination of the short hash, while protecting the anonymity of the patrons since the short hash cannot identify exactly who was in the bar or casino. This more private information can be obtained through the long hash and/or data repository. (A watermark detector reads a watermarked document. The short hash is examined to verify age. The short hash is then stored in a list or data repository to evidence that the identification document was checked to verify age.).

As an alternative to a short hash of information, the cardholder's birth date is used as a semi-unique ID. To provide even further uniqueness, we can add additional bits to the birth date, so the likelihood of overlap with another identification document (short hash) lessens.

In another implementation, an identification document includes a plural-bit watermark payload. The plural-bits include a representation a document bearer's date of birth (DOB). The payload includes a few extra, random bits and can be used to anonymously audit that the establishment, such as a bar or casino, checked the identification document. The random bit can be placed in a predetermined bit location. A bar or casino includes a watermark reader at the establishment's entrance. A patron presents her watermarked identification document including the plural bit payload (which includes, e.g., 2-8 random bits) to the watermark reader. The reader reads the watermark to obtain the DOB and the random bits, which are saved in list or data record. The random bits help distinguish two individuals that may have the same birth date. To audit the bar or casino, an auditor again reads the patron's watermarked identification document to obtain the DOB and random bits. The DOB and random bits are checked against the list or data record. A match evidences that the bar or casino checked the patron's age. A DOB is not unique to a person—since many people have the same DOB—so while a DOB likely shows that an identification document was checked, the DOB and random bits, alone, cannot be used to identify which individual was at the establishment—thus providing anonymous age verification.

Associating random bits with a date of birth (DOB) may also help thwart piracy when the plural-bit payload is encrypted. Since identical bits encrypt to identical, but different bits, adding a few random bits to a payload makes it harder for a pirate to create their own table linking payloads to some other meaningful information. In other words, without encryption a pirate can create a relational table between payloads and meaning, such as an issuing branch, operator ID, timestamp, client code, state office and encrypted forensic ID. Although the pirate's table will not match the real information, the table can still be valuable. For example, the pirate may be able to embed the correct encrypted state forensic ID, embedding location and time (optional) that a document identifier was created, with stolen watermark secrets even if they cannot decrypt the payload. But inserting random bits cause random encryption results —even for the same payload. After decryption, and since the random bits locations are known, the random bits are removed to provide a useful payload for the entity with the authorized decryption key. However, without the decryption key, the random bits provide pirates with random payloads. For example, two random bits provides four potential encrypted results (2^n where n is number of random bits, in general). In addition, a payload may include a few bits for error checking to guarantee that the correct decryption key is used.

Shelf-Life Identification Document

Another aspect of the present invention provides a so-called "shelf-life" digital watermark on an identification document. Of course, our inventive shelf-life watermark can alternatively be placed on another types of security documents, like passports, checks, banknotes, pass cards, etc., and other printed objects like stamps, labels and product packaging. The shelf-life digital watermark is steganographically embedded in the document with an ink or ink combination that degrades or simply rubs off with time or use. For example, the ink degrades over time or after being sufficiently handled or machine-processed. (Thus, the term "shelf-life" is a characteristic provided by the ink or dye, and not a watermark signal characteristic.).

Inks typically have at least two primary components: pigment and a binder (or adhesive). The amount or characteristics of the binder (hereafter interchangeably used with "adhesive") will determine how readily the ink adheres or stays on a substrate. Most often, a goal is to ensure that the ink adequately adheres to a substrate. In this aspect of the invention, however, we desire that at least one ink includes a binder that has low adhesive qualities.

Consider our inventive implementations.

In a first implementation, we provide (or print) a digital watermark on an identification document with low-adhesive ink. The ink is designed such that it will rub off or degrade with use. One use is handling the card. The ink rubs off or degrades as a cardholder uses the card. Another use is machine-processing the card, e.g., through a chemical or aqueous solution and/or machine swipe (e.g., where a machine includes brushes or rollers that contact the low-adhesion ink, etc.). In other cases, the adhesion is designed to degrade with time—resulting in the ink loosing adhesion with the card. Regardless of which technique is used to constitute use, once the shelf-life ink is gone, the digital watermark is lost.

The absence of a digital watermark on a card triggers or evidences card expiration, a need to reissue a card, or to signal a predetermined length or number of uses, etc.

In a second implementation, we print an identification document with two or more inks. A first ink includes an relatively higher-adhesion adhesive. A digital watermark is embedded on the identification document using the relatively higher-adhesion adhesive. Second ink is printed or applied over the first ink. The second ink includes a relatively lower-adhesion adhesive. The second ink degrades or rubs off with use, which reveals the digital watermark embedded in the first ink below.

The detection of the digital watermark embedded with the first ink is used as a triggers or detection measure, to indicate or evidence expiration, the need for reissue, etc.

Image Capture and Watermark Embedding Systems using Reversible Watermarking

The following section relates to U.S. patent application Ser. Nos. 10/319,404 (published as US 2003-0149879 A1); U.S. patent application Ser. Nos. 10/319,380 (published as US 2003-0179900 A1); 10/435,517 (now U.S. Pat. No. 7,006, 662); and U.S. application Ser. No.10/435,612 (published as US 2004-0044894 A1). Each of these patent documents is herein incorporated by reference.

Reversible Watermarking

Some of the above related patent applications teach high capacity digital watermarks that can be removed, restoring a watermarked content object (e.g., an image) to its original, pristine state. (See also Tian, "Wavelet-Based Reversible Watermarking for Authentication," Proc. of SPIE, Vol. 4675, pp. 679-690, January, 2002; and Tian, "Reversible Watermarking by Difference Expansion," Proc. Multimedia Security Workshop, Dec. 6, 2002.)

Other reversible watermarking techniques are also known, e.g., in U.S. Pat. Nos. 5,646,997 and 6,278,791, and in Fridrich et al, "Lossless Data Embedding for All Image Formats," Proc. SPE, Vol. 4675, pp. 572-583, January, 2002; Dittmann et al, "Watermarking Protocols For Authentication And Ownership Protection Based On Timestamps And Holograms," Proc. SPIE, Vol. 4675, pp. 240-251, Jan., 2002; Fridrich et al, "Invertible Authentication," Proc. SPIE, Vol. 4314, pp. 197-208, January, 2001; Macq, "Lossless Multiresolution Transform For Image Authenticating Watermarking," *Proceedings of EUSIPCO*, Sept. 2000; Vleeschouwer et al, "Circular Interpretation Of Histogram For Reversible Watermarking," *Proceedings of IEEE 4th Workshop on Multimedia Signal Processing*, Oct. 2001; Kalker et al, "Capacity bounds And Constructions For Reversible Data Hiding," *Proceedings of the 14th International Conference on Digital Signal Processing*, volume 1, pages 71-76, July 2002; and Celik et al, "Reversible Data Hiding," *Proceedings of International Conference on Image Processing*, volume II, pages 157-160, Sept. 2002. Other reversible watermarking techniques will doubtlessly be developed in the future.

The ability to remove a digital watermark from an encoded image opens the possibility of various novel applications. Several such applications are detailed herein.

More on Identification Documents

Identification documents play a critical role in today's society. Identification documents are used on a daily basis—to prove identity, to verify age, to access a secure area, to evidence driving privileges, to cash a check, and so on. Airplane passengers are required to show an identification document during check in, security screening, and/or prior to boarding their flight. In addition, because we live in an ever-evolving cashless society, identification documents are used to make payments, access an ATM, debit an account, or make a payment, etc.

Many types of identification documents, such as driving licenses, national or government identification cards, passports, visas, bankcards, credit cards, controlled access cards and smart cards, carry thereon certain items of information which relate to the identity of the bearer. Examples of such information include name, address, birth date, signature, biometrics and photographic image; the documents may in addition carry other variant data (i.e., data specific to a particular card or document, for example an employee number) and invariant data (i.e., data common to a large number of cards, for example the name of an employer).

In the production of images useful in the field of identification documentation, it is oftentimes desirable to embody into an identification document data or indicia representative of a document issuer (e.g., an official seal, or the name or mark of a company or educational institution) and data or indicia representative of the document bearer (e.g., a photographic likeness, name or address). Typically, a pattern, logo or other distinctive marking representative of the document issuer serves as a means of verifying the authenticity, genuineness or valid issuance of the document. A photographic likeness or other data or indicia personal to the bearer will validate the right of access to certain facilities or the prior authorization to engage in commercial transactions and activities.

Manufacture of Identification Documents

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data is forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail. Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing," ultra-violet security features, security indicia and other features currently unique to centrally issued identification documents. Another security advantage with centrally issued documents is that the security features and/or secured materials used to make those features are centrally located, reducing the chances of loss or theft (as compared to having secured materials dispersed over a wide number of "on the spot" locations).

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents is manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to a person, on the spot, after a successful exam.). In some instances, the very nature of the OTC assembling process results in small, sometimes compact, printing and card assemblers for printing the ID document. OTC identification documents of the types mentioned above can take a number of forms, depending on cost and desired features. Some OTC ID documents comprise highly plasticized polyvinyl chloride (PVC), TESLIN, polycarbonate, or have a composite structure with polyester laminated to 0.5-2.0 mil (13-51 .mu.m) PVC film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the print head, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the print head. The choice of laminate dictates the degree of durability and security imparted to the system in protecting the image and other data.

Biometrics

Biometrics is a science that refers to technologies that can be used to measure and analyze physiological characteristics, such as eye retinas and irises, facial patterns, hand geometry, and fingerprints. Some biometrics technologies involve measurement and analysis of behavioral characteristics, such as voice patterns, signatures, and typing patterns. Because biometrics, especially physiological-based technologies, measures qualities that an individual usually cannot change, it can be especially effective for authentication and identification purposes.

Systems and methods are known that are capable of analyzing digital images and recognizing human faces. Extraction of facial feature information has been used for various applications such as in automated surveillance systems, monitoring systems, human interfaces to computers, systems that grant a person a privilege (e.g. a license to drive or a right to vote), systems that permit a person to conduct a financial transaction, television and video signal analysis. For example, commercial manufacturers, such as Identix Corp of Minnetonka, Minn. (which includes Visionics Corp.) manufacture biometric recognition systems that can be adapted to be capable of comparing two images, such as facial images or fingerprint images. The IDENTIX FACE IT product may be used to compare two facial images to determine whether the two images belong to the same person. Other commercial products are available that can compare two fingerprint images and determine whether the two images belong to the same person. For example, U.S. Pat. Nos. 6,072,894, 6,111, 517, 6,185,316, 5,224,173, 5,450,504 and 5,991,429 further describe various types of biometrics systems, including facial recognition systems and fingerprint recognition systems, and these patents are hereby incorporated by reference in their entirety. Facial recognition has been deployed for applications such as surveillance and identity verification.

Some face recognition applications use a camera to capture one or more successive images of a subject, locate the subject's face in each image, and match the subject's face to a one or faces stored in a database of stored images. In some face recognition applications, the facial images in the database of stored images are stored as processed entities called templates. A template represents the preprocessing of an image (e.g., a facial image) to a predetermined machine-readable format. Encoding the image as a template helps enable automated comparison between images. For example, in a given application, a video camera can capture the image of a given subject, perform processing necessary to convert the image to a template, then compare the template of the given subject to one or more stored templates in a database, to determine if the template of the subject can be matched to one or more stored templates.

In surveillance, for example, a given facial recognition system may be used to capture multiple images of a subject, create one or more templates based on these captured images, and compare the templates to a relatively limited "watch list" (e.g., set of stored templates), to determine if the subject's template matches any of the stored templates. In surveillance systems, outside human intervention may be needed at the time of enrolling the initial image for storage in the database, to evaluate each subject's image as it is captured and to assist the image capture process. Outside human intervention also may be needed during surveillance if a "match" is found between the template of a subject being screened and one or more of the stored templates. In another example, some driver license systems include a large number of single images of individuals collected by so called "capture stations." The capture stations include components that can capture an image of a person, and then, using circuitry, hardware, and/or software, process the image and then compare the image with stored images, if desired. When configured for face recognition applications, these identification systems can build template databases by processing each of the individual images collect at a capture station to provide a face recognition template thereby creating a template for every individual. A typical driver license system can include millions of images. The face recognition template databases are used to detect individuals attempting to obtain multiple licenses. Another application provides law enforcement agencies with an investigative tool. The recognition database can discover other identities of a known criminal or may help identify an unidentified decedent.

Identifying Image Regions for Watermark Embedding

With reference to FIG. 3, a watermark embedding system includes a digital watermark embedder and a face locator module. Both the embedder and the module can be realized, e.g., by software executing on a computer processor or separate computer processors. An image input device (e.g., a digital camera, digital video camera, web camera, scanner or optical sensor) communicates with the face locator module. The input device captures optical scan data corresponding to a human subject. The optical scan data is communicated to the face locator module. The face locator module operates primarily to locate a face of a subject, and perhaps to center or otherwise align the face (and head, torso, etc.) within a predefined image frame. The face locator module can operate based on a number of different methods, such as locating the subject's eyes and estimating (or locating) face edges relative to the location of the eyes, distinguishing the face from the background, edge detection, etc. In some implementations, the face locator module locates and removes the subject from image background, e.g., separates the subject from a photograph background, to obtain a silhouette image of the subject. In other cases the face locator module centers or aligns the face within an image frame.

An operator or an automated process feeds information related to the subject or related to the subject's identification document to the watermark embedder. This information may include a birth date or age indicator, document number, name, physical characteristic, biometric, document-based feature or text, unique identifier, computer link, etc., or some combination of these. The information can be manually input or machine-sensed. The information can even be hashed (or reduced in bit size) and/or error corrected.

The face locator module passes processed image data to the watermark embedder. In some cases, the face locator module passes in a silhouette image; in other cases, the module passes in a centered or aligned image. In still other cases two versions of the same image are passed to the watermark embedder, one that will appear as a document portrait and another that will become a so-called "ghost" (or faintly visible) image which is also printed on the document. The watermark embedder embeds the inputted information, an encrypted version of the inputted information, or a hashed variant of the inputted information into the processed image data. The information can be redundantly embedded in the processed image data, or embedded in a select area, e.g., only in a silhouette, or in a region (e.g., face) of the silhouette. In some implementations, we embed a hash or other reduced-bit representation of the information in the image. In other implementations the watermark information is embedded in a centered or aligned image. In still other implementations, a mask is presented to determine an image location(s) that will carry the embedded data.

The watermark embedder optionally employs encryption to achieve an encrypted payload or message. The encryption can include a variety of techniques including PKI or private key encryption. For example, the inputted information is encrypted and then embedded in an image. In another implementation the embedding protocol is keyed or encrypted for security (e.g., an encrypted embedding channel). For example, the watermark embedder uses a unique key in its data hiding methodology. The watermark embedder can even, optionally, interface with a key management system. The key management system helps maintain and organize various keys for different watermark embedders or platforms. An embedder may even use different keys for different watermarks embedded in the same image or document. For example, a first watermark is embedded in an image with a first key and a second watermark is embedded in the image with a second key. Of course, a watermark embedding system can include both an encrypted payload and a keyed (or encrypted) embedding protocol. The embedder is preferably tunable, e.g., the embedding can be varied to best balance intensity, visibility, and robustness to accommodate a printer or printers used for printing the watermarked image. A resulting embedded watermark can either be robust or fragile, depending on the application. The embedded image is printed on an identification document. In some implementations, an embedded image is printed, along with a ghosted (perhaps embedded) version of the embedded image, on an identification document. (Sometimes a document enrollment process is geographically separate from a document printing. In these case watermark embedding can occur at the point of enrollment, or at the point of printing.)

In some implementations the embedder embeds two or more different digital watermarks into the image. (A watermark embedder may use a common or unique key for embedding each watermark.) For example, consider a situation where the face locator identifies multiple regions in an image. A first region corresponds to the subject's face, which may include a face, hair (if any), neck and torso, or a silhouette of the human subject. A second region corresponds to what is typically referred to as an image background. A first watermark is embedded in the face or silhouette region while a second digital watermark is embedded in the background region. The first and second digital watermarks may include redundant or corresponding information. For example, the first digital watermark may include a first portion of a document number, while the second digital watermark may include the second portion of the document number. Or the first digital watermark may include a key to decode or decrypt the second digital watermark. Still further, the first and second watermarks (or payloads carried by the watermarks) may be related through a cryptographic relationship. The cross-correlation of the first and second digital watermarks may help prevent photo swapping or counterfeiting, since a background is then tied to the silhouette.

A second or third digital watermark can be embedded elsewhere on the identification document, e.g., in a background image, ghost image, seal, graphic, text (e.g., though line shifting or varying fonts), patterns, etc. The digital watermarks can be cross-correlated to even further tie the image (and regions within the image) to the identification document.

In one implementation of this embodiment, master stock used as printing paper or as identification document substrate includes a digital watermark, barcode or other machine-readable identifier to uniquely serialize the document. This machine-readable identifier can be read, perhaps by showing the paper/substrate to a camera or scanner or by automatically processing the paper/substrate by a customized optical reader that is attached to a paper feed side of the printer. The embedded data in the substrate can be confirmed for authenticity and perhaps used in computing the information to be embedded in the image.

A few possible combinations are shown below. Of course, these combinations are not meant to limit the scope of this aspect of the invention. Rather, the combinations are provided by way of example only.

A1. A method of digital watermarking image data for use with an identification document, said method comprising: receiving image data corresponding to a human subject; analyzing the image data to identify at least a face region and a non-face region; embedding a first digital watermark in the face region, wherein the first digital watermark includes a first payload; embedding a second digital watermark in the non-face region, wherein the second digital watermark includes a second payload; wherein the first digital watermark payload and the second digital watermark payload include corresponding information; and providing the embedded image data for use with an identification document.

A2. A method of making an identification document comprising: receiving the image data embedded according to combination A1; and providing the embedded image data on an identification document surface.

A3. The method of combination A2, wherein the identification document includes artwork thereon, wherein the artwork comprises a third digital watermark.

A4. The method of claim A1, wherein the corresponding information comprises redundant information found in each of the first payload and the second payload.

A5. The method of claim Al, wherein the first and second payloads correspond through a cryptographic key.

A6. The method of claim 10, wherein the first and second payloads correspond through an embedding protocol.

Watermarking Digital Images for use with Identification Documents

When images are captured at one location (e.g., at a DMV location) and digitally distributed to a remote facility for printing on identification documents, as is common in so-called "central issue" systems, an embedded digital watermark can be used as an authentication measure for a digital image. The digital watermark preferably includes a payload or message. The watermark message can include, for example, a data element that identifies a camera station (or camera serial number) used for image capture or a camera location. This data element can be used or combined with other data to confirm that the digital image originated at an authorized or designated image capture site. Further, the embedded data can be of a type (e.g., a fragile or semi-fragile watermark) to help detect alteration of the image, to indicate if the image had been tampered with between image capture and image delivery, or to date stamp an image. The date stamp can be compared to an expected date as a further authentication tool. (In a related, but alternative embodiment, we carry an image signature in an image header. The image signature is obtained from the header and used to detect whether the image has been changed in transit. We note that a header signature is less secure than a digital watermark implementation, since a header can be separated from the digital image more readily than can a digital watermark.).

As an alternative implementation, we embed a so-called reversible watermark (e.g., a watermark that can be removed from an image without significant image degradation) during an image capture and/or watermark embedding process, e.g., at a DMV location. Several reversible watermarking techniques are disclosed above in the "Reversible Watermarking" sub-section of this patent document. The reversible watermark preferably includes an identifier to identify the image, the subject depicted in the image or information related to the image, subject or subject's identification document. The reversible watermark may also include an authentication component that is station or individual specific to help prevent forgeries.

Figure 4:
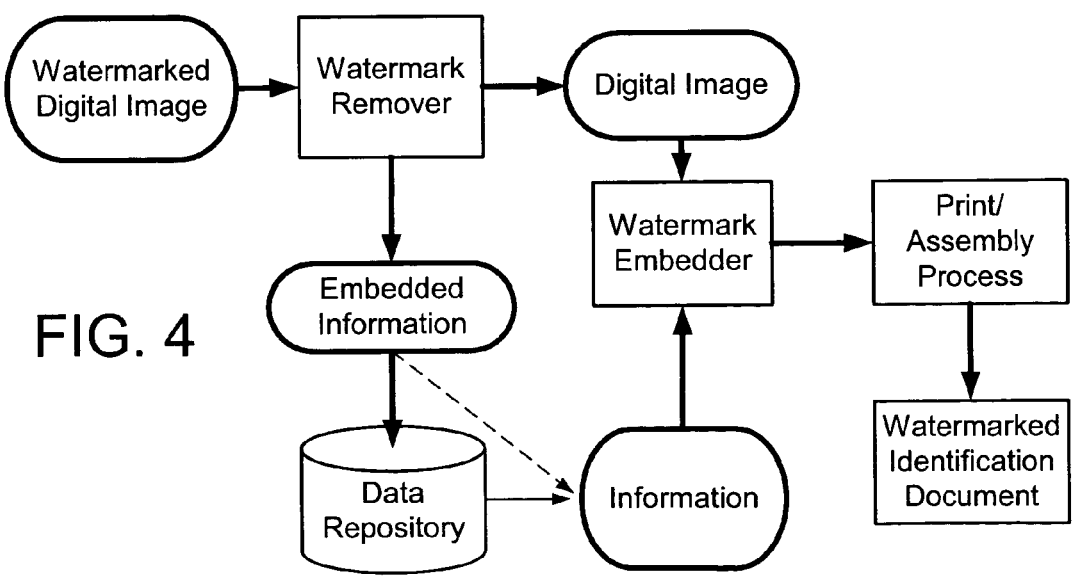
FIG. 4 illustrates an identification document printing/assembling system including a watermark remover.

With reference to FIG. 4, a watermarked digital image is provided to a watermark remover—perhaps located at a central issuing site. The watermark remover detects, decodes and removes the watermark from the digital image. (In some implementations the watermark is embedded according to a keyed (or encrypted) protocol. Only a watermark remover including the corresponding key has the appropriate authority to remove the watermark. In other implementations, the act of receiving a watermarked image and/or removing a watermark from an image triggers a an entry in a transaction log to record the received watermark data, and the act of removing the watermark, for later auditing.) The removed watermark information (e.g., an identifier) links to, or provides an index for, a data repository or to a specific data record. The solid arrow into the Data Repository represents this "link" (FIG. 4). Information is retrieved from the data repository or data record and may include, e.g., printer-specific embedding parameters, card holder information, unique identifiers, batch run information, etc., etc. The Data Repository may even include a pristine copy of the digital image. This information is passed to a watermark embedder for embedding in the digital image. (Or, as an alternative, the same or corresponding information is provided to a watermark embedder—dashed line in FIG. 4). The information is steganographically embedded in the digital image, perhaps using the same or different embedding protocol, or using embedding parameters that are particularly well-suited for the central facility printer and assembling profiles. For example, the information is embedded into a photographic representation included in the digital image, and/or embedded in a graphic or background included in the digital image. The embedded digital image is printed or otherwise provided on an identification document. (While we have discussed removing only one digital watermark, we envision handling images including two or more watermarks as well.)

Further information can be maintained in the data repository. For example, the watermark identifier may be linked to a data record, which is updateable to reflect a distribution chain associated with a digital image. The data repository, perhaps accessible through a network, can be updated to reflect image capture times, operator identifiers, transmission channels, handling particulars, identification document printer number or printing time, etc.

Marking Multiple Layers of an Identification Document for Additional Security

In related U.S. patent application Ser. No. 09/938,870, filed Aug. 23, 2001 (published as US 2002-0099943 A1), which are each herein incorporated by reference, we disclose techniques for authentication.

An improvement is provided to help deter photo swapping in identification documents and to elevate the difficulty in forging identification documents. Generally, our techniques link two watermarking processes to ultimately strengthen the difficulty in scanning and reproducing a qualifying watermarked identification document.

With reference to FIG. 5, a first digital watermark component is embedded in a photograph or other image area of an identification document. The photograph is provided (e.g., printed) on an identification document. Although not pictured in FIG. 5, an identification document may include a plurality of layers including one or more laminate layers. The embedded photograph or other image area may be provided on a substrate layer or on a laminate layer. We provide embedded data (e.g., a second watermark component) in the laminate layer. The first and second watermarks can include corresponding information. The correspondence of this first and second information can be used to authenticate the validity of the authentication document.

The watermarked laminate layer preferably includes the watermark information in pels or surface deviation on the card surface (e.g., the laminate layer). The gathering or texturing of a laminate layer creates peaks and valleys in the laminate layer surface when viewed from the side or z-axis (see FIG. 6). A collection of peaks and valleys are arranged so as to convey the second digital watermark. Message elements (or binary ones and zeros) can be conveyed by arranging peaks and valleys in a predetermined pattern, or by grouping peaks and valleys, etc. Essentially, the second watermark is conveyed through texture of the laminate layer. This texture allows us to use a different, non-visible light scanning techniques to validate the watermark. Instead of an optical sensor we then employ a laser based or other measuring device that detects minute changes in the topographical differences (e.g., peaks and valleys) of the laminate layer. These topographical variations translate to a map or signal that conveys the second watermark information.

Alternatively, the second marking is laser engraved or etched into the surface of the laminate layer. Still further, a pattern is formed in the laminate layer through embossing or lithography. The pattern conveys a steganographic signal. The signal is decoded to reveal a message, which is cross-correlated with the first digital watermark signal.

Document authentication for this implementation requires a dual scanner (or multiple scanners). A person scanning the image must have a scanner that contains an imaging device (e.g., optical sensor) and a measuring device (surface topology reader). The optical (CCD, CMOS etc.) sensor will capture an image (or image data) of the watermarked photograph or document substrate, and the measuring device (e.g., laser or surface detection) interprets the surface topology of the laminate. The first and second watermark components can be respectively recovered from such data. Once recovered, the first and second watermarks are compared to authenticate the identification document.

One advantage of this implementation is that it is extremely hard to scan in an identification card document optically to obtain the first watermark, and then also analyze the laminate's topology to obtain the second watermark, without a second scanner.

A few possible combinations are shown below. Of course, these combinations are not meant to limit the scope of this aspect of the invention. Rather, the combinations are provided by way of example.

B1. A method of authenticating an identification document, the identification document comprising a substrate and a laminate covering at least a portion of the substrate, a first graphic carried by at least one of the substrate and the laminate, the first graphic conveying a recognizable image to human viewers thereof, the first graphic being steganographically encoded to secretly convey first plural bits of digital data recoverable by computer analysis of optical scan data representing at least some of the first graphic, wherein the laminate layer is steganographically encoded to secretly convey second plural bits of digital data through surface deviations in the laminate layer, and wherein the second plural bits of digital data are recoverable computer analysis of the surface deviations in the laminate layer, said method comprising: receiving optical scan data associated with the graphic and analyzing the optical scan data to recover the first plural bits; receiving digital data corresponding to the surface deviations and analyzing the digital data to recover the second plural bits; and cross-correlating the first plural bits and the second plural bits to authenticate the identification document.

B2. The method of combination B1, wherein the optical scan data comprise a result of visible light scanning of the identification document.

B3. The method of combination B2, wherein the digital data is obtained from a non-visible light optical sensor.

B4. The method of combination B3, wherein the sensor comprises a laser.

B5. The method of combination B4, wherein the laser determines relative height of the surface deviations.

B6. The method of combination B5, wherein the second plural bits are conveyed through the relative height of the surface deviations.

B7. The method of combination B1, wherein the first graphic is steganographically encoded with a first digital watermark.

B8. The method of combination B1, wherein cross-correlating of the first plural bits and the second plural bits to authenticate the identification document comprises comparing a sub-sets of the first plural bits and the second plural bits.

B9. The method of combination B1, further comprising visibly altering the identification document if said cross-correlation step reveals that the identification document is not authentic.

B10. The method of combination B9, wherein the identification document is visibly altered by at least one of physically marking the document, perforating the document, exposing ink on the document, providing ink on the document, providing a sticker on the document, exposing the document with polarized light, and applying pressure to the document.

C1. An identification document comprising: a substrate and a laminate covering at least a portion of the substrate; a first graphic carried by at least one of the substrate and the laminate, the first graphic conveying a recognizable image to human viewers thereof, the first graphic being steganographically encoded to secretly convey first plural bits of digital data recoverable by first computer analysis of optical scan data representing at least some of the first graphic; and wherein the laminate layer is steganographically encoded to secretly convey second plural bits of digital data through surface deviations in the laminate layer, wherein the second plural bits of digital data are recoverable second computer analysis of the surface deviations in the laminate layer, and wherein the first plural bits and the second plural bits cooperate to authenticate said identification document.

C2. The identification document of combination C1, wherein the surface deviations in the laminate layer are detectable through laser analysis of the laminate surface.

C3. The identification document of combination C1, wherein the first graphic comprises a photographic representation of an authorized bearer of the identification document.

C4. The identification document of combination C1, wherein the surface deviations comprise laser engraving.

C5. The identification document of combination C1, wherein the surface deviations comprise embossing.

C6. The identification document of combination C1, wherein the surface deviations comprises intentional texturing.

Conclusion

The foregoing are just exemplary implementations of the present invention. It will be recognized that there are a great number of variations on these basic themes. The foregoing illustrates but a few applications of the detailed technology. There are many others.

Consider, for example, the use of embedded watermark data in a document to allow access to a resource. A card may be used to grant physical access through a normally locked door. Or a card may be used to logon to a computer network— with directory privileges tied to the data decoded from the card.

In many embodiments, the data encoded in the card may serve as an index to a larger repository of associated data stored in a remote database. Thus, for example, an index datum read from a passport may allow a passport inspector to access a database record corresponding to the encoded data. This record may include a reference photograph of the passport holder, and other personal and issuance data. If the data obtained from the database does not match the text or photograph included on the card, then the card has apparently been altered.

Having described and illustrated the principles of the invention with reference to illustrative embodiments, it should be recognized that the invention is not so limited.

To provide a comprehensive disclosure without unduly lengthening this specification, applicants incorporate by reference, in their entireties, the disclosures of the above-cited patent documents. The particular combinations of elements and features in the above-detailed embodiments are exemplary only; the interchanging and substitution of these teachings with other teachings in this application and the incorporated-by-reference patents/applications are also contemplated.

The above-described methods and functionality can be facilitated with computer executable software stored on computer readable mediums, such as electronic memory circuits, RAM, ROM, magnetic media, optical media, removable media, etc. Such software may be stored on a user terminal, and/or distributed throughout a network.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of verifying an age of a bearer of a document, said method comprising:
    receiving, at a processor, first digital data corresponding to an age indicator, the first digital data being obtained from auxiliary data steganographically embedded in the document using a fragile watermark, wherein the fragile watermark is predictably degraded when the document is copied;
    determining the document is an original document and not a copy of the original document based on a predictable degradation of the fragile watermark;
    receiving second digital data corresponding to a biometric indicator, the second digital data being obtained from auxiliary data steganographically embedded in the document;
    receiving third digital data corresponding to a biometric sample, wherein the biometric sample corresponds to the bearer, and the biometric sample is physically captured from the bearer; and
    verifying the bearer's age based upon determining the first digital data indicates that the bearer is at least as old as a predetermined age, determining the second digital data and the third digital data correspond, and the determining the document is the original document based on the predictable degradation of the fragile watermark.

2. The method of claim 1, further comprising interrogating a data repository with the biometric indicator to obtain the second digital data.

3. The method of claim 2, further comprising interrogating the data repository with the age indicator to obtain the first digital information.

4. The method of claim 2, wherein the second digital data comprises a biometric template associated with the bearer.

5. The method of claim 4, wherein the biometric template includes information associated with at least one of the bearer's fingerprint, face map, hand geometry, iris, retina, DNA, voiceprint or vein pattern.

6. The method of claim 4, wherein the auxiliary data comprises plural bits of data and wherein the biometric indicator and the age indicator comprise the same plural bits.

7. The method of claim 1, wherein the third digital data is received through a network.

8. The method of claim 7, wherein the network comprises the internet.

9. The method of claim 1, wherein the biometric indicator comprises a biometric template.

10. The method of claim 9, wherein the biometric template includes information associated with at least one of the bearer's fingerprint, face map, hand geometry, iris, retina, DNA, voiceprint or vein pattern.

11. The method of claim 1, further comprising comparing a timestamp contained within the third digital data with a current time to determine if the third digital data is fresh, wherein verifying the bearer's age further requires that the third digital data is fresh.

12. A method of anonymously verifying an age or characteristic associated with a person associated with an identification document, the identification document including a document layer and printing carried by the document layer, the identification document further including a digital watermark embedded therein, the digital watermark including a first set of information, the first set of information including information to verify age or an age level of the person, the method comprising:

receiving optical scan data corresponding to the identification document, the optical scan data being generated by an optical sensor;

decoding the scan data with a configured multi-purpose electronic processor to obtain the first set of information included in the digital watermark, the first set of information including a concatenated string of data comprising an age indicator and additional data, wherein the digital watermark is embedded in the identification document through hidden changes to data representing one or more items carried by the identification document, wherein the digital watermark is a fragile watermark, and wherein the fragile watermark is predictably degraded when the identification document is copied;

determining the document is an original document and not a copy of the original document based on a predictable degradation of the fragile watermark;

receiving second optical scan data physically captured from the person associated with the identification document;

verifying the identification document based on the second optical scan data, the additional data, and the determining the document is the original document based on the predictable degradation of the fragile watermark; and determining, based on the first set of information, the person's age or age level in connection with an age-related transaction or event, wherein said act of determining protects the anonymity of the person in possession of the identification document from said multi-purpose electronic processor or entity performing the determining.

13. The method of claim 12, wherein the identification document further comprises a second set of information embedded therein, the second set of information corresponding to a third set of information that is printed on the identification document, wherein the second set of information comprises an index for accessing a data repository.

14. The method of claim 13, wherein the index comprises a hash of the third set of information that is printed on the identification document.

15. The method of claim 13, further comprising computing a hash of the third set of information that is printed on the identification document, decoding the second set of information that is embedded in the identification document to obtain the embedded hash, and comparing the computed hash and the embedded hash to determine authenticity of the document.

16. The method of claim 12, further comprising storing at least a portion of the first set of information in at least one of a list, electronic memory circuits or a data record, wherein the stored portion of the first set of information serves as an audit clue to evidence that the identification document has been examined.

17. The method of claim 16, wherein the first set of information comprises two or more random bits.

18. The method of claim 17, wherein the first set of information comprises a date of birth.

19. The method of claim 18, wherein a combination of the random bits and the date of birth decrease likelihood of overlapping birth dates, while maintaining an anonymous audit clue.

20. A method comprising:

receiving first optical scan data that is associated with an identification document, the identification document comprising plural-bits of data carried by the identification document, wherein the plural-bits of data comprise at least a first field and a second field, the first field carrying or linking to information corresponding to a bearer of the identification document and the second field corresponding to an age or age level of the bearer of the identification document;

receiving information corresponding to the bearer based on the first field;

receiving second optical scan data physically captured from the bearer;

verifying the identification document based on the first field and the second optical scan data;

utilizing a configured multi-purpose electronic processor, decoding the first optical scan data to recover data corresponding to at least the second field;

steganographically decoding information carried by the document, separate from the data corresponding to at least the second field, and generating a reduced-bit representation of the received information by using a configured multi-purpose electronic processor, wherein the information is embedded in the document using a fragile watermark, wherein the fragile watermark is predictably degraded when the document is copied;

determining the document is an original document and not a copy of the original document based on a predictable degradation of the fragile watermark; and comparing data corresponding to the second field with the reduced-bit representation to verify an age level associated with the document in connection with an age-related transaction or event, wherein neither the data corresponding to the second field nor the reduced-bit representation betray the identity of the bearer of the identification document to said multi-purpose electronic processor or an entity performing said act of comparing, wherein the verification of the age level is based in part on the determining the document is an original document based on the predictable degradation of the fragile watermark.

21. The method of claim 20, further comprising storing the data corresponding to the second field in a data repository to evidence examination of the identification document.

22. The method of claim 20, further comprising printing the data corresponding to the second field to evidence examination of the identification document.

23. An apparatus comprising:

a processor configured to:

receive first digital data corresponding to an age indicator, the first digital data being obtained from auxiliary data steganographically embedded in the document using a fragile watermark, wherein the fragile watermark is predictably degraded when the document is copied;

determine the document is an original document and not a copy of the original document based on a predictable degradation of the fragile watermark;

receive second digital data corresponding to a biometric indicator, the second digital data being obtained from auxiliary data steganographically embedded in the document;

receive third digital data corresponding to a biometric sample, wherein the biometric sample corresponds to the bearer, and the biometric sample is physically captured from the bearer; and verify the bearer's age based upon a determination that the first digital data indicates that the bearer is at least as old as a predetermined age, a determination that the second digital data and the third digital data correspond, and the determination that the document is the original document based on the predictable degradation of the fragile watermark.

24. A non-transitory computer-readable medium having instructions stored thereon that, if executed by a computing device, cause the computing device to perform operations comprising:

receiving first digital data corresponding to an age indicator, the first digital data being obtained from auxiliary data steganographically embedded in the document using a fragile watermark, wherein the fragile watermark is predictably degraded when the document is copied;

determining the document is an original document and not a copy of the original document based on apredictable degradation of the fragile watermark;

receiving second digital data corresponding to a biometric indicator, the second digital data being obtained from auxiliary data steganographically embedded in the document;

receiving third digital data corresponding to a biometric sample, wherein the biometric sample corresponds to the bearer, and the biometric sample is physically captured from the bearer; and verifying the bearer's age based upon determining the first digital data indicates that the bearer is at least as old as a predetermined age, the second digital data and the third digital data correspond, and the determining the document is the original document based on the predictable degradation of the fragile watermark.

25. An apparatus comprising:
a processor configured to:
receive optical scan data corresponding to an identification document, the optical scan data being generated by an optical sensor, wherein the identification document is associated with a person, the identification document including a document layer and printing carried by the document layer, the identification document further including a digital watermark embedded therein, the digital watermark including a first set of information, the first set of information including information to verify age or an age level of the person;

decode the scan data to obtain the first set of information included in the digital watermark, the first set of information including a concatenated string of data comprising an age indicator and additional data, wherein the digital watermark is embedded in the identification document through hidden changes to data representing one or more items carried by the identification document, and wherein the digital watermark is a fragile watermark, wherein the fragile watermark is predictably degraded when the identification document is copied;

determine the document is an original document and not a copy of the original document based on a predictable degradation of the fragile watermark;

receive second optical scan data physically captured from the person associated with the identification document;

verify the identification document based on the second optical scan data, the additional data, and the determination that the document is the original document based on the predictable degradation of the fragile watermark; and determine, based on the first set of information, the person's age or age level in connection with an age-related transaction or event, wherein said act of determining protects the anonymity of the person in possession of the identification document from the processor or an entity associated with said determining.

26. A non-transitory computer-readable medium having instructions stored thereon that, if executed by a computing device, cause the computing device to perform operations comprising:

receiving optical scan data corresponding to an identification document, the optical scan data being generated by an optical sensor, wherein the identification document is associated with a person, the identification document including a document layer and printing carried by the document layer, the identification document further including a digital watermark embedded therein, the digital watermark including a first set of information, the first set of information including information to verify age or an age level of the person;

decoding the scan data to obtain the first set of information included in the digital watermark, the first set of information including a concatenated string of data comprising an age indicator and additional data, wherein the digital watermark is embedded in the identification document through hidden changes to data representing one or more items carried by the identification document, and wherein the digital watermark is a fragile watermark, wherein the fragile watermark is predictably degraded when the identification document is copied;

determining the document is an original document and not a copy of the original document based on a predictable degradation of the fragile watermark;

receiving second optical scan data physically captured from the person associated with the identification document;

verifying the identification document based on the second optical scan data, the additional data, and the determination that the document is the original document based on the predictable degradation of the fragile watermark; and determining, based on the first set of information, the person's age or age level in connection with an age-related transaction or event, wherein said act of determining protects the anonymity of the person in possession of the identification document from the computing device or an entity associated with said determining.

27. An apparatus comprising:
a processor configured to:
receive first optical scan data that is associated with an identification document, the identification document comprising plural-bits of data carried by the identification document, wherein the plural-bits of data comprise at least a first field and a second field, the first field carrying or linking to information corresponding to a bearer of the identification document and the second field corresponding to an age or age level of the bearer of the identification document;

receive information corresponding to the bearer based on the first field;

receive second optical scan data physically captured from the bearer;

verify the identification document based on the first field and the second optical scan data;

decode the first optical scan data to recover data corresponding to at least the second field;

steganographically decode information carried by the document, separate from the data corresponding to at least the second field, and generating a reduced-bit representation of the received information, wherein the information is embedded in the document using a fragile watermark, wherein the fragile watermark is predictably degraded when the document is copied;

determine the document is an original document and not a copy of the original document based on a predictable degradation of the fragile watermark; and compare data corresponding to the second field with the reduced-bit representation to verify an age level associated with the document in connection with an age-related transaction or event, wherein neither the data corresponding to the second field nor the reduced-bit representation betray the identity of the bearer of the identification document to the processor or an entity performing said act of comparing, and wherein the verification of the age level is based upon the determination that the document is the original document based on the predictable degradation of the fragile watermark.

28. A non-transitory computer-readable medium having instructions stored thereon that, if executed by a computing device, cause the computing device to perform operations comprising:

receiving first optical scan data that is associated with an identification document, the identification document comprising plural-bits of data carried by the identification document, wherein the plural-bits of data comprise at least a first field and a second field, the first field carrying or linking to information corresponding to a bearer of the identification document and the second field corresponding to an age or age level of the bearer of the identification document;

receiving information corresponding to the bearer based on the first field;

receiving second optical scan data physically captured from the bearer;

verifying the identification document based on the first field and the second optical scan data;

decoding the first optical scan data to recover data corresponding to at least the second field;

steganographically decoding information carried by the document, separate from the data corresponding to at least the second field, and generating a reduced-bit representation of the received information, wherein the information is embedded in the document using a fragile watermark, wherein the fragile watermark is predictably degraded when the identification document is copied;

determining the document is an original document and not a copy of the original document based on a predictable degradation of the fragile watermark; and comparing data corresponding to the second field with the reduced-bit representation to verify an age level associated with the document in connection with an age-related transaction or event, wherein neither the data corresponding to the second field nor the reduced-bit representation betray the identity of the bearer of the identification document to the computing device or an entity performing said act of comparing, and wherein the verification of the age level is based upon the determination that the document is the original document based on the predictable degradation of the fragile watermark.

* * * * *

UNITED STATES PATENT AND TRADEMARK OFFICE
CERTIFICATE OF CORRECTION

PATENT NO.         : 8,543,823 B2
APPLICATION NO.    : 10/686547
DATED              : September 24, 2013
INVENTOR(S)        : Carr et al.

Page 1 of 1

It is certified that error appears in the above-identified patent and that said Letters Patent is hereby corrected as shown below:

On the Title Page, item (57), under "ABSTRACT", in Column 2, Line 16, delete "though" and insert -- through --, therefor.

In the Specifications

In Column 2, Line 40, delete "image?" and insert -- image, --, therefor.

In Column 9, Line 67, delete "21)." and insert -- 21). --, therefor.

In Column 12, Lines 2-3, delete "an relatively" and insert -- a relatively --, therefor.

In Column 12, Line 19, delete "U.S. application Ser. No. 10/435,612" and insert -- 10/435,612 --, therefor.

In Column 12, Line 34, delete "SPE," and insert -- SPIE, --, therefor.

In Column 17, Line 57, delete "claim A1," and insert -- combination A1, --, therefor.

In Column 17, Line 60, delete "claim A1," and insert -- combination A1, --, therefor.

In Column 17, Line 62, delete "claim 10," and insert -- combination A1, --, therefor.

In Column 18, Line 45, delete "a an entry" and insert -- an entry --, therefor.

In the Claims

In Column 25, Line 20, in Claim 24, delete "apredictable" and insert -- a predictable --, therefor.

Signed and Sealed this
Twenty-fifth Day of March, 2014

Michelle K. Lee
*Deputy Director of the United States Patent and Trademark Office*